United States Patent
Hannah

(10) Patent No.: US 11,301,693 B2
(45) Date of Patent: Apr. 12, 2022

(54) MANAGED ACCESS SYSTEM FOR TRAFFIC FLOW OPTIMIZATION

(71) Applicant: Marc R. Hannah, Los Altos, CA (US)

(72) Inventor: Marc R. Hannah, Los Altos, CA (US)

(*) Notice: Subject to any disclaimer, the term of this patent is extended or adjusted under 35 U.S.C. 154(b) by 0 days.

(21) Appl. No.: 15/929,799

(22) Filed: May 22, 2020

(65) Prior Publication Data

US 2020/0356786 A1 Nov. 12, 2020

Related U.S. Application Data

(63) Continuation of application No. 14/875,678, filed on Oct. 5, 2015, now Pat. No. 10,664,707.

(Continued)

(51) Int. Cl.
*G06K 9/00* (2006.01)
*H04W 4/80* (2018.01)
*G08G 1/017* (2006.01)
*G08G 1/01* (2006.01)
*G08G 1/0967* (2006.01)
(Continued)

(52) U.S. Cl.
CPC ......... *G06K 9/00785* (2013.01); *G08G 1/012* (2013.01); *G08G 1/017* (2013.01); *G08G 1/0116* (2013.01); *G08G 1/0129* (2013.01); *G08G 1/0133* (2013.01); *G08G 1/0145* (2013.01); *G08G 1/0175* (2013.01); *G08G 1/04* (2013.01); *G08G 1/096741* (2013.01); *G08G 1/096783* (2013.01); *G08G 1/202* (2013.01); *H04W 4/80* (2018.02); *G08G 1/092* (2013.01);
(Continued)

(58) Field of Classification Search
CPC .......................... G06R 9/00785; G08G 1/0116

USPC ........................................................ 701/118
See application file for complete search history.

(56) References Cited

U.S. PATENT DOCUMENTS 6,873,600 B1   3/2005   Duffield et al.
9,947,052 B1 * 4/2018   Slusar .............. G08G 1/096775
(Continued)

FOREIGN PATENT DOCUMENTS

CN   1431635 A   7/2003
CN   1530633 A   9/2004
(Continued)

OTHER PUBLICATIONS

Machine Translation, JP2002243473, Massaki (Year: 2002).*
(Continued)

*Primary Examiner* — Charles A Fox
*Assistant Examiner* — Michael E Butler
(74) *Attorney, Agent, or Firm* — Womble Bond Dickinson (US) LLP

(57) ABSTRACT

The present disclosure relates to methods and systems to manage traffic density in a transportation system, and by doing so, maintain, in one embodiment, traffic flows near optimum levels to maximize road capacity and minimize travel times. The method includes, in one embodiment, a mechanism for vehicles to request road access from a centralized control, a queuing system that allows road access to be granted to individual vehicles over an extended period of time in a fair and organized fashion, a measurement system that allows traffic flow and density throughout the system to be determined in real-time, and an enforcement and fraud prevention mechanism to ensure that the rules and permissions imposed by the system are followed.

14 Claims, 9 Drawing Sheets

Related U.S. Application Data

(60) Provisional application No. 62/060,511, filed on Oct. 6, 2014.

(51) Int. Cl.
  *G08G 1/04* (2006.01)
  *G08G 1/00* (2006.01)
  *G08G 1/09* (2006.01)

(52) U.S. Cl.
  CPC ....... *G08G 1/093* (2013.01); *G08G 1/096716* (2013.01); *G08G 1/096775* (2013.01); *G08G 1/207* (2013.01)

(56) References Cited

U.S. PATENT DOCUMENTS

| | | | |
|---|---|---|---|
| 2001/0029425 A1 | 10/2001 | Myr | |
| 2002/0072963 A1* | 6/2002 | Jonge | G07B 15/063 705/13 |
| 2002/0077743 A1 | 6/2002 | Schmidt | |
| 2003/0018428 A1* | 1/2003 | Knockeart | G08G 1/096861 342/357.31 |
| 2004/0181337 A1 | 9/2004 | Kawasaki et al. | |
| 2004/0222904 A1 | 11/2004 | Ciolli | |
| 2006/0286969 A1* | 12/2006 | Talmor | G06Q 20/341 455/415 |
| 2010/0302362 A1 | 12/2010 | Birchbauer et al. | |
| 2011/0077808 A1* | 3/2011 | Hyde | G06Q 10/08 701/22 |
| 2011/0090078 A1 | 4/2011 | Kim et al. | |
| 2012/0050489 A1 | 3/2012 | Gupta et al. | |
| 2013/0218455 A1 | 8/2013 | Clark | |
| 2014/0039787 A1 | 2/2014 | Bourne | |
| 2014/0346284 A1 | 11/2014 | Fries et al. | |
| 2015/0246654 A1 | 9/2015 | Tadic et al. | |
| 2016/0223337 A1 | 8/2016 | Uno | |
| 2016/0300162 A1* | 10/2016 | McManus | G07B 15/02 |

FOREIGN PATENT DOCUMENTS

| | | | |
|---|---|---|---|
| CN | 101657698 A | 2/2010 | |
| CN | 101782396 A | 7/2010 | |
| CN | 102201164 A | 9/2011 | |
| CN | 103413455 A | 11/2013 | |
| CN | 103824467 A | 5/2014 | |
| CN | 103854314 A | 6/2014 | |
| CN | 103854488 A | 6/2014 | |
| CN | 104050804 A | 9/2014 | |
| DE | 102007008289 A1 | 8/2008 | |
| DE | 102012011501 A1 | 12/2013 | |
| JP | 2002243473 * | 8/2002 | G01C 21/00 |

OTHER PUBLICATIONS

Chinese Office Action for Chinese Patent Application No. 201580053693.3, dated Oct. 10, 2019, 17 pages.
Translation for JP2002243473 Masaaki.
Translation for DE102012011501 Khanafer.
PCT Invitation To Pay Additional Fees And, Where Applicable, Protest Fee, for PCT/US2015/054278, mailed Jan. 21, 2016.
PCT Search Report and Written Opinion for PCT International Application No. PCT/US2015/054278 dated May 24, 2016 (21 pages).
PCT International Preliminary Report on Patentability for PCT International Application No. PCT/US2015/054278 dated Apr. 20, 2017 (17 pages).

\* cited by examiner

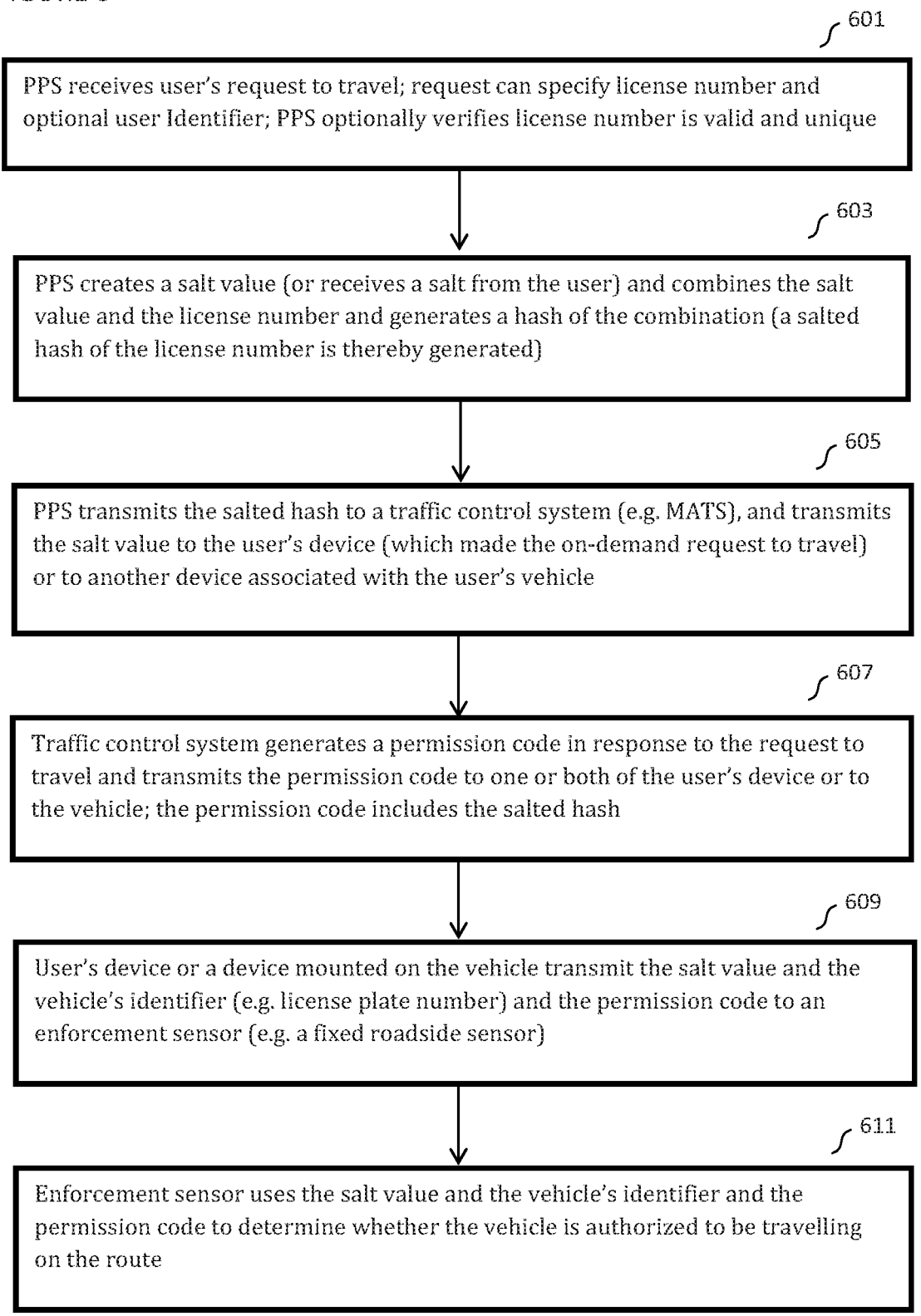

Example Key Fob System Diagram

Example Transponder System Diagram

Example Smart License Plate Frame System Diagram

Example In-Vehicle Display Device System Diagram

MANAGED ACCESS SYSTEM FOR TRAFFIC FLOW OPTIMIZATION

This application is a continuation of co-pending U.S. application Ser. No. 14/875,678 filed Oct. 5, 2015, which claims the benefit of U.S. Provisional Patent Application No. 62/060,511, filed Oct. 6, 2014, which are incorporated herein by reference.

BACKGROUND

In many major cities around the world, trip durations during peak traffic hours can be 5 to 10 times what they are in uncongested traffic. This results in significant additional costs in fuel, personal time, business productivity, and pollution. Congestion relief measures often take one of three forms:

1) increase system capacity by building more roads,
2) improve flows by adjusting signal timing, entry/exit controls, etc., or
3) improve flows by reducing the number of vehicles in any given region, road, or lane.

The focus of the present disclosure is method 3—to increase flows by reducing the number of vehicles on the road (vehicle density). To understand the advantages of reducing vehicle density it's useful to look at the general relationship between vehicle density and overall traffic flow. The curve in the graph shown in FIG. 1 is representative of how traffic density (vehicles per mile along a road) effects vehicle flow (vehicles per hour passing a point).

The intersecting straight lines show vehicle speed at the intersection with the curve (flow divided by density). The absolute numbers should not be taken too literally, but the shape generally holds true, and it shows both how inefficient highly congested traffic is at utilizing available road capacity and how drastically vehicle density must be reduced from worst case congestion levels of greater than 200 vehicles per mile per lane (26 feet per vehicle) to maximize flow.

The roughly triangular curve shows that starting from zero, as vehicles are added total flow increases because there are more vehicles travelling at a speed limited only by individual driving practices and traffic regulations. As density approaches the peak of the curve, vehicle speed starts to decline as drivers slow in response to the higher density, and total flow starts to level off. Past the peak, adding more vehicles becomes counterproductive, reducing both total flow and individual vehicle speeds. Notice that there is a wide range of densities around the peak where flow remains about the same despite significant reductions in speed. Perhaps an intuitive explanation for this is the tendency for drivers in heavy traffic to space themselves approximately a fixed time apart (e.g. 1.5 seconds) to allow for reaction time and stopping distance. That fixed time spacing results in a fixed flow rate over a broad range of speeds.

Given the shape of the curve, the ideal maximum density to operate at is probably a little before the peak (point A), where flows are near optimum and vehicle speeds are still close to that of free flowing traffic. Operating in that region of the curve might require reducing vehicles on the road to a small fraction (20-30%) of worst case congestion levels, but individual vehicle speeds can be 5-10 times faster.

Many methods and systems are currently in use to reduce vehicle density. Some are very direct, such as mandating days of the week when certain vehicle license numbers cannot be on the road, while others are more indirect, such as improvements in public transportation and encouraging carpools. A very common method is to use tolls and fees to increase the cost of using the road. If the costs are high enough, a segment of the population will choose a route or transportation means that avoids that cost.

A disadvantage of existing cost-driven methods, however, is that they place an uneven burden on the driving population based upon financial status. Those that can afford to pay the toll are able to take advantage of the less congested restricted routes and lanes, while those who cannot must deal with even higher traffic densities on whatever roads or lanes are left. In this sense, they are not income neutral or fair. Also, because of this affordability constraint, their demand reduction effects help, but often fall far short of what would be necessary to maximize traffic flow efficiencies in highly oversaturated road systems.

Rather than organizing and managing the demand to actively and directly control traffic density, nearly all other congestion reduction methods in use in places like Singapore, London, and Stockholm use demand reduction (i.e., use some other transportation method, go some other time, or don't go at all) as their primary target, and do so indirectly through cost disincentives.

SUMMARY OF THE DESCRIPTION

The present disclosure generally relates to methods and systems to manage vehicle traffic density on one or more roads in a transportation system by controlling road access via one or more of: permissions, tolls, fees, and penalties. Control can be managed in real-time based upon demand, and permissions and fees are in one embodiment specific to individual vehicles requesting access. Centralized software algorithms can manage access permissions in a way, in one embodiment, that prevents excessive traffic demand from reducing traffic flows below optimum levels, thereby maximizing (or at least improving) road capacity and minimizing (or at least improving) travel times.

A traffic management system can be implemented in a variety of different embodiments using existing infrastructure (e.g. cameras on roads) or using new infrastructure or equipment (e.g. enforcement sensors mounted on one or more roads). In one embodiment, a method to operate a managed traffic system can include: receiving a request from a user to travel in a vehicle (e.g. a user's car) having a vehicle identifier (e.g. the vehicle's license plate); determining a current traffic congestion condition for the request to travel, wherein the current traffic congestion condition provides information about the traffic's density or rate of flow along one or more routes for the travel request from the user; determining a travel delay based on the request and based on the current traffic congestion condition, wherein the travel delay represents a waiting time after the request to travel; and transmitting a message to a device (e.g. smartphone or key fob of user), the message indicating when, based on the travel delay, the vehicle is authorized to begin to travel according to the request. In one embodiment, the travel delay is calculated or determined to provide a vehicle density (vehicles along a route of a known, fixed size) that is below or equal to a goal for vehicle density (e.g. a threshold value), where the goal for vehicle density is below a typical traffic density that exists during "rush hour", or other peak driving times, when traffic control is not implemented. In another embodiment, the travel delay is calculated or determined to provide a vehicle rate of flow (e.g. average speed of vehicles along a portion of or all of a route) that is above or equal to a goal for vehicle rate of flow, where this goal is above a typical vehicle rate of flow that exists during "rush hour", or other peak driving times, when traffic control is not implemented. The request to travel can include at least one of: (a) destination or origin; (b) a direction of travel; (c) an origin and destination; or (d) one or more routes. In one embodiment, the method also includes: recording violations for traveling on one or more roads without authorization from the traffic management system based on data received from a set of one or more sensors; and determining fines based on the recorded violations. The one or more sensors can be configured to provide information which is used to detect one or more vehicles travelling on the roads without authorization; the sensors can provide or obtain data such as: camera images of one or more license plates (which can be processed with known optical character recognition techniques to derive a license plate number); radio frequency (RF) signals identifying one or more vehicles; or one or more permission codes specifying identifiers of one or more vehicles and route information for the one or more vehicles. In one embodiment, the one or more sensors are coupled to one or more servers that can cause the fines to be enforced against the users who traveled without authorization. This method can be implemented by one or more data processing systems (e.g. a set of servers) that manage the traffic by determining the travel delay for each request from users who seek to travel on routes which have access controlled by the traffic control system. The users can send their requests to the traffic control system from any one of a variety of devices or methods such as: a phone (via voice or text message); a web browser on a computer or smartphone; an app on a smartphone; a dedicated device in a car; a dedicated device in a self-driving car; a key fob that operates like a long range text pager; the users can also receive the message (which authorizes the start of the trip) on any one of the devices, and the user device that makes the travel request can be different than the user device that receives the message (which authorizes the start of the trip).

In one or more embodiments, a traffic control system can also operate with other devices (in addition to the one or more servers that determine the travel delay and in addition to a user device such as a smartphone and app that sends the request to travel). These other devices can include one or more of: sensors for road and traffic conditions; enforcement sensors designed to detect whether vehicles are authorized to be traveling along one or more routes; one or more servers configured to provide privacy and/or to anonymize requests to travel and/or vehicle identifiers (such as license plate numbers or vehicle identification number); and one or more servers operated by or under the control of one or more government agencies that can implement and enforce fines for vehicles which are caught traveling without authorization.

The sensors for road and traffic conditions can be conventional or existing sensors, such as cameras, that provide information about one or more of: traffic density, or traffic rate of flow or road conditions such as accidents, road failures, etc.

The enforcement sensors can be fixed roadside sensors or sensors on vehicles, such as smart license plate holders, that can, in one embodiment, receive permission codes from vehicles along the one or more routes that have access controlled by a traffic control system. For example, in one embodiment, a fixed roadside enforcement sensor can receive a permission code containing the vehicle's license plate number (or an obfuscated version of that number, such as hash of that number) and then compare that license plate number (obtained from the permission code) to the license plate number captured by the enforcement sensor (which can be captured either with a camera or by an RF signal, containing the license plate number, transmitted by a device, such as a toll transponder or smart license plate holder, on the car). If the enforcement sensor determines that the two license plate numbers (or hashes of the numbers) do match, then the enforcement sensor, which is coupled to the traffic control system, does not report a violation, but if the enforcement sensor determines that the two license plate numbers do not match then the enforcement sensor does report a violation to one or more of the traffic control system or government agencies. In one embodiment, the enforcement sensor receives a salt value and the license plate number and the permission code from a device on the vehicle (such as a key fob on the vehicle or a smart license plate holder on the vehicle), and the enforcement sensor (either a fixed roadside sensor or a smart license plate holder on another vehicle) uses the salt, the permission code, and the license plate number to determine whether the license plate number (or salted hash of that number) contained in the permission code matches the license plate number (or obfuscated version of the number) on the vehicle. Other information about such enforcement sensors is described further below.

In one embodiment, a traffic control system can operate in conjunction with one or more data processing systems, such as one or more servers, that provide privacy or anonymize requests to travel and/or vehicle identifiers. These servers can be coupled to both the traffic control systems and also to the user devices that send requests to travel and receive messages authorizing the start of the traveling/trip. These servers can be referred to as permission privacy servers. In one embodiment, a permission privacy server can include a network interface (e.g. Ethernet interface) and a processing system coupled to the network interface and memory coupled to the processing system, and the network interface is configured to communicate with a traffic control system that transmits messages to user devices (such as users' smartphones or key fobs), which messages indicate when vehicles are authorized to begin to travel; the processing system is configured to receive requests to travel from the user devices, where the requests specify the vehicle identifiers (or obfuscated versions of the vehicle identifiers), and the processing system is configured to transmit anonymized identifiers, corresponding to the vehicle identifiers, to the traffic control system to permit the traffic control system to identify vehicles without using the actual vehicle identifiers.

The present disclosure includes the words "optimally" or "optimum" or similar words, and it should be appreciated that the use of such words is not intended to require that the embodiments described herein are in fact actually optimal solutions because less than actually optimal solutions can still provide significant benefits in reduced travel time. Thus, these words, such as "optimum", should be interpreted as meaning an improved solution by reducing travel time; in other words, the travel time has been at least improved relative to what it would be without the traffic control systems described herein.

The embodiments described herein can include one or more of methods, devices, systems, and non-transitory computer readable medium that store executable program instructions which when executed by a data processing system cause the data processing system to perform the one or more methods described herein.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIG. 6 is a flowchart that shows an embodiment which uses a permission privacy server.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Examining the Opportunity

Figure 1:
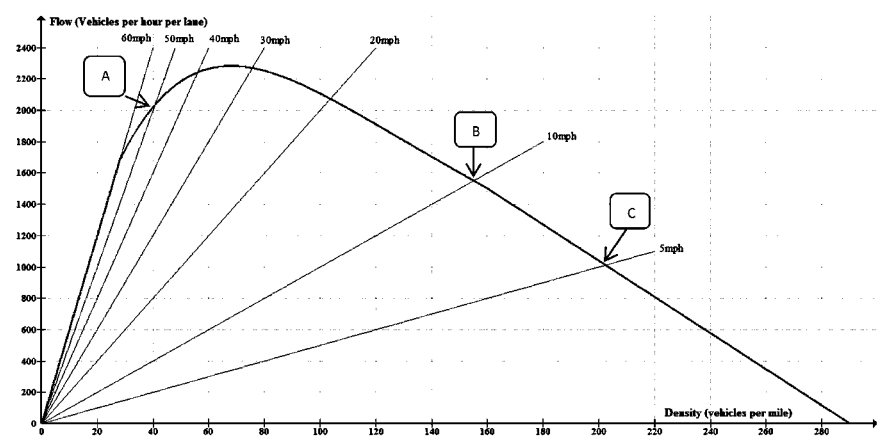
FIG. 1 is a graph showing the relationship between traffic density and vehicle flow along a route.

To illustrate the improvements possible if vehicle density can be directly controlled, consider a simplified example of the end of the work day. Assume the roads are operating at Point A in FIG. 1 near peak flow with N vehicles on the road, when suddenly another 3N vehicles want to get on the road, quadrupling density (point B in FIG. 1) if unmanaged. Using the numbers in the graph in FIG. 1, density would increase from 40 vehicles/mile to roughly 160 vehicles/mile, with average speed dropping from about 50 miles/hour to about 10 miles/hour, and flow from 2000 to 1600 vehicles/hour. A trip that took 30 minutes before the rush would take 150 minutes (2 hours and 30 minutes) after the rush begins.

If, however, road access is controlled, in one embodiment, by making additional vehicles wait for one vehicle to clear the area before another can start, the situation is substantially improved. Assuming an average trip time (T) of 30 minutes, N vehicles will exit the road on average every 30 minutes, so individuals would need to wait from 0 to 90 (3T) minutes to clear the 3N vehicle backlog, with an average wait of 45 minutes. The average travel latency (trip+wait time) would be 75 minutes vs. 150 minutes if unmanaged—half the time, with vehicle fuel consumed one-fifth that time. Best case travel latency is 30 minutes (no wait), and worst case is 120 minutes (90 minute wait). Even in the worst case, arrival time at the destination is 30 minutes sooner than the unmanaged alternative, there's a substantial fuel savings with its corresponding reduction in pollution, and the potential to use the 90 minutes of waiting time productively (working, shopping, relaxing, etc.).

Of course, the example above is highly simplified and the flow/density curve shown is not exact, but it should be clear to anyone who has inched along in highly congested traffic at speeds of less than 5 mph (point C and beyond on the curve in FIG. 1) that enormous improvements are possible with managed road access. By operating saturated roads optimally, travel latency could be cut in half for everyone, and with very little additional infrastructure and no required fees for vehicles in compliance.

Implementation Example—Overview

In one possible embodiment, which will be subsequently referred to as MATS (Managed Access Traffic System), anyone wanting to drive somewhere would first request road access permission from central MATS servers via any one of many possible ways, including a phone call, text message, smartphone app, web page or dedicated electronic device. Additional information such as where they are and where they want to go may accompany the request. The MATS server would quickly respond, either granting permission to immediately leave, or giving a position in a virtual departure queue and perhaps a countdown timer showing approximately how much wait time is left. Once the front of the virtual queue is reached, the requesting driver is signaled, permission to depart is granted and their journey can begin. The basic user interaction can be as simple as that. It's also possible for part or all of the road access request/grant protocol be automatically performed by a device that knows when and where a user wants to travel. For example, if the user travels in a self-driving car, the user may be able to enter the request to travel in the self-driving car (or enter the request on their smartphone which communicates with one or both of MATS and the self-driving car), and MATs can reply to the self-driving car with the permission code and the car can start the trip automatically when permission to depart is granted. The self-driving car can automatically enforce the start travel time and the route selected.

The MATS system would maintain a real-time database of current and historical traffic flows throughout the managed traffic area obtained through a network of sensors monitoring the roads. Using this database to predict the impact of additional vehicles along route possibilities, the MATS server would grant immediate permission or assign departure queue positions in a way that keeps traffic flowing smoothly. As a deterrent to gaming the wait (i.e., asking to leave before actually ready) and potentially other reasons associated with managing flows, a queue position might be randomized and any countdown timer displayed for the user could sometimes run faster or slower than real-time to create some uncertainty in the wait. Origin and destination information given might be very specific (e.g., GPS coordinates, street address, or business name) or less precise, specifying only a general area. If specific start/end information is given, the MATS system might also offer advice on the best route to take and the estimated arrival time. It is envisioned that the MATS server software may maintain multiple queues, possibly corresponding to various road segments that may be subject to congestion, various starting points, and various trip lengths. Since congestion is typically not uniform, but rather highest on main roads and highways and sometimes primarily in one direction, the more information the MATS server has about specific routing when granting permissions, the shorter the wait can be if high demand road segments are known to be avoided. During times of low demand, there may be no necessity or benefit to providing any destination or route information, since immediate departure permission would be granted in any case.

Users are typically granted permissions from the front of a departure queue when it is predicted by the traffic control server software that they will not increase traffic density beyond target levels. Target vehicle speeds could also play role in the algorithm. Various algorithms can be used, but in general, it involves predicting approximately when the vehicle will reach a controlled road segment from its current location, and what the traffic density will be on that segment at that time. Alternatively, the software could look at current densities on controlled segments, then allow vehicles off the departure queues at a rate roughly equal to the target flow rate. If the measured vehicle densities are higher than targeted, the departure rate could be reduced somewhat (i.e., more vehicles allowed to leave than enter the road to reduce density). If densities are lower than targeted, the departure rate could be increased (i.e., more vehicles entering than leaving the road to increase density).

Note that there are three parameters that can be measured and utilized in the departure queue management algorithms: density, flow, and speed. Density is the parameter most directly being controlled, but since they are generally related, any one, two, or three could be measured and utilized in the algorithm. In a simple implementation of the MATS system, where a single limited access freeway is controlled, the algorithm can be simpler. In a more complex implementation where there are multiple intersecting controlled roads with numerous entry and exit points, the algorithm to predict the correct departure rate for individual queues may be very complex. In any case, whatever algorithm is initially implemented, it can evolve as experience is gained with the system and user behaviors. Until that experience is gained, it may be prudent to start with target densities near the peak of the flow vs. density curve, where flows are maximized and less sensitive to variations in density, even though vehicle speeds are reduced. Also a factor in choosing the target density and vehicle speed (at least initially) is the psychology of people waiting in the departure queue. Slower speeds at times when the departure wait is long gives people an intuitive understanding that emptying the queues faster would make things worse.

If the system is implemented without permission codes, verification of permission is performed by checking the license number and location of each vehicle on controlled roads against the access permissions contained in the central database using a network of roadside verification sensors that include automated license plate readers (e.g., cameras and optical character recognition systems)

Once granted, access permission is reflected in a centralized database entry, and possibly also with a unique, verifiable digital permission code. If issued, the permission code could be transmitted by the vehicle while on the road as one possible way to verify authorization. Permissions can designate specific restrictions, including vehicle license number, geographical (where the vehicle is allowed to be), temporal (when the vehicle is allowed to be where), or other specifics. Permission restrictions may allow for intermediate stops, and multiple permission codes to be used sequentially may be issued at the same time. Permission codes, which include a data payload containing restrictions, are transmitted along with a digital signature computed using standard protocols (e.g., Digital Signature Standard—DSS) to a network of receivers along the roadways. Using these protocols, the permission code and included data can be authenticated and the transmitting vehicle checked against any access restrictions.

Figure 2:
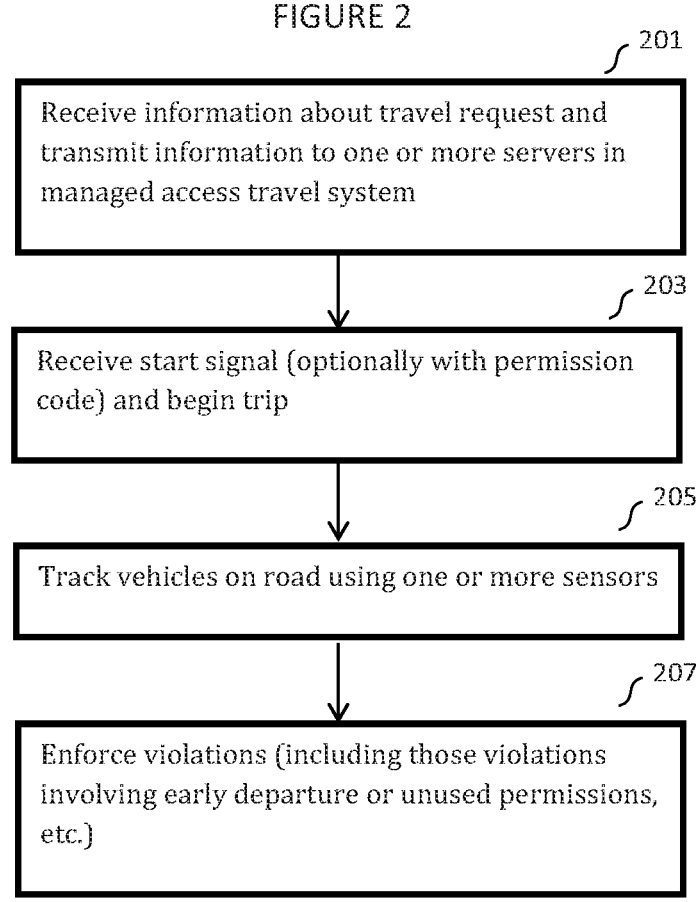
FIG. 2 shows a flowchart that depicts a method according to one or more embodiments described herein.

FIG. 2 shows a flowchart representing a method according to one or more embodiments which use a traffic control system such as a MATS. The method can begin in operation 201 in which a user device receives information about a travel request being made on demand by a user. In one embodiment, this travel request can be made by a user inputting the travel request into an app on a smartphone, where the app is configured to operate with the traffic control system and may be provided by the traffic control system in order to interoperate with the traffic control system. The user device can then transmit information about the travel request to one or more servers, such as the traffic control system servers 401 shown in FIG. 4. Those servers can then obtain information about the current traffic congestion condition for the request to travel and then determine a travel delay based on the request and based on the current traffic congestion condition, wherein the travel delay represents a waiting time after the request to travel. The travel request can include at least one of: a destination or origin; a direction of travel; an origin and a destination; or one or more proposed routes. The traffic control system servers can then transmit a message indicating when, based on the travel delay, the vehicle is authorized to begin travel according to the request. In operation 203, the user device or another device associated with the user can receive the start signal and begin the trip. In one embodiment, the user device or another user device can optionally receive a permission code which is used to operate with enforcement sensors which can be positioned along the route or which can be on other vehicles along the route as described further herein. In operation 205, the enforcement sensors along the route or road can track the vehicles to determine whether or not the vehicles are authorized to be on the route at the current time. In operation 207 the system can then enforce violations based upon determining vehicles are traveling without proper authorization along the route. These violations can include early departures in which the user did not wait until the start time or situations in which the user requested permission by making a request to travel and did not use the request to travel, perhaps because the user is attempting to game the system by making a premature request to travel.

To address potential privacy concerns about the long term storage and abuse of information transmitted to the central MATS server, the request for permission can be anonymous and use a hash of the vehicle license number designated for the permission rather than the actual license number. The hash can be generated by a known one-way hashing algorithm, e.g., SHA-2 which generates a value from which the license number cannot be derived. When the permission is checked for validity (e.g., by an enforcement sensor), the license number of the vehicle transmitting the permission code can be hashed and verified against the hashed license number contained in the permission code. This allows the permission code to be issued and validated without transmitting vehicle license numbers to central servers. Once granted, access permission is reflected in a centralized database entry, and possibly also with a unique, verifiable digital permission code. If issued, the permission code could be transmitted by the vehicle while on the road as one possible way to verify authorization. Permissions can designate specific restrictions, including vehicle license number, geographical (where the vehicle is allowed to be), temporal (when the vehicle is allowed to be where), or other specifics. Permission restrictions may allow for intermediate stops, and multiple permission codes to be used sequentially may be issued at the same time. Permission codes, which include a data payload containing restrictions, are transmitted along with a digital signature computed using standard protocols (e.g., Digital Signature Standard—DSS) to a network of receivers along the roadways. Using these protocols, the permission code and included data can be authenticated and the transmitting vehicle checked against any access restrictions.

If the hash generated by a vehicle license number is the same for an extended period of time (anything from days to years), vehicle history can be anonymously maintained on the servers for future reference to provide additional guidance to traffic management algorithms and user interactions (e.g., providing default destinations). Unfortunately, this also enables the database to be easily searched for any vehicle history given a known license number, and all license numbers are necessarily known by the issuing agency. Once granted, access permission is reflected in a centralized database entry, and possibly also with a unique, verifiable digital permission code. If issued, the permission code could be transmitted by the vehicle while on the road as one possible way to verify authorization. Permissions can designate specific restrictions, including vehicle license number, geographical (where the vehicle is allowed to be), temporal (when the vehicle is allowed to be where), or other specifics. Permission restrictions may allow for intermediate stops, and multiple permission codes to be used sequentially may be issued at the same time. Permission codes, which include a data payload containing restrictions, are transmitted along with a digital signature computed using standard protocols (e.g., Digital Signature Standard—DSS) to a network of receivers along the roadways. Using these protocols, the permission code and included data can be authenticated and the transmitting vehicle checked against any access restrictions.

To prevent misuse of this historical information, the hashing result can be periodically changed in a way that is not ordinarily known by the central MATS servers. This can be accomplished using what is known as a salted hash, where a random numeric value (the "salt") is combined with the vehicle license number before being run through the hashing algorithm. The period of use for a given salt value may be controlled by the user. The longer that period, the more history can be kept if there are usability benefits to a longer history. It's also possible to change the salt value with every permission code request if no central history is desired. Once granted, access permission is reflected in a centralized database entry, and possibly also with a unique, verifiable digital permission code. If issued, the permission code could be transmitted by the vehicle while on the road as one possible way to verify authorization. Permissions can designate specific restrictions, including vehicle license number, geographical (where the vehicle is allowed to be), temporal (when the vehicle is allowed to be where), or other specifics. Permission restrictions may allow for intermediate stops, and multiple permission codes to be used sequentially may be issued at the same time. Permission codes, which include a data payload containing restrictions, are transmitted along with a digital signature computed using standard protocols (e.g., Digital Signature Standard—DSS) to a network of receivers along the roadways. Using these protocols, the permission code and included data can be authenticated and the transmitting vehicle checked against any access restrictions.

For enforcement, the vehicle would locally transmit the salt value of the license number hash in addition to the permission code, allowing the result of the license number hash to be regenerated by the enforcement sensor without sending the license number or salt value to the MATS central servers. In one embodiment, only if the enforcement sensors detect a violation would it be necessary to send the license number of the violating vehicle to MATS servers, possibly along with any additional evidence necessary to prove the violation should it be contested. Making the software and hardware used in the enforcement sensors public can increase public confidence that identifiable personal histories are not being transmitted to or stored by MATS servers. Once granted, access permission is reflected in a centralized database entry, and possibly also with a unique, verifiable digital permission code. If issued, the permission code could be transmitted by the vehicle while on the road as one possible way to verify authorization. Permissions can designate specific restrictions, including vehicle license number, geographical (where the vehicle is allowed to be), temporal (when the vehicle is allowed to be where), or other specifics. Permission restrictions may allow for intermediate stops, and multiple permission codes to be used sequentially may be issued at the same time. Permission codes, which include a data payload containing restrictions, are transmitted along with a digital signature computed using standard protocols (e.g., Digital Signature Standard—DSS) to a network of receivers along the roadways. Using these protocols, the permission code and included data can be authenticated and the transmitting vehicle checked against any access restrictions.

Another way to preserve some history to allow for a more streamlined user interface while preserving some level of privacy is to store that history in the personal device (e.g. smartphone with app or key fob) used to make travel access requests rather than in the central servers. Features such as default destinations and auto-completion can be implemented using historical information stored locally. Further obfuscation of user history that is sent to central servers can be accomplished in the personal device by not sending the true starting and ending locations of an access request, but instead using locally stored knowledge of server algorithms and traffic conditions to provide pseudo-destinations that will yield the same permissions as the true locations. Once granted, access permission is reflected in a centralized database entry, and possibly also with a unique, verifiable digital permission code. If issued, the permission code could be transmitted by the vehicle while on the road as one possible way to verify authorization. Permissions can designate specific restrictions, including vehicle license number, geographical (where the vehicle is allowed to be), temporal (when the vehicle is allowed to be where), or other specifics. Permission restrictions may allow for intermediate stops, and multiple permission codes to be used sequentially may be issued at the same time. Permission codes, which include a data payload containing restrictions, are transmitted along with a digital signature computed using standard protocols (e.g., Digital Signature Standard—DSS) to a network of receivers along the roadways. Using these protocols, the permission code and included data can be authenticated and the transmitting vehicle checked against any access restrictions.

One possible embodiment of the permission codes using hashed license numbers is described below in Table 1:

TABLE 1

PermissionCode = [PermissionData, DigitalSignature]
PermissionData = [LicenceID, VehicleDescription, StartTime, Duration, LocationRestrictions]
LicenseID = [Hash(LicenseSalt, LicenseNumber)]
VehicleDescrition = [VehicleYear, VehicleMake, Vehicle Model, VehicleColor]
LocationRestrictions = [StartLoc, TripSegment, . . . , TripSegment]
DigitalSignature = [Encryption(SigPrivateKey, Hash(PermissionData))]
StartTime = GMT time of day when permission becomes valid
Duration = Length of time permission stays valid
StartLoc = GPS latitude and longitude of starting location
TripSegment = [DeltaLatitude, DeltaLongitude, DeltaTime, MaxDeviation]
DeltaLatitude = Change of latitude between start and end of segment
DeltaLongitude = Change of longitude between start and end of segment
DeltaTime = Allowed travel time between start and end of segment
MaxDeviation = Maximum allowed distance from straight line between start and end of segment
TransmittedPermission = [PermissionCode, LicenseSalt]

Although the MATS system tries to keep vehicle speeds and travel times predictable, it's possible that an unexpected road delay (e.g., a traffic accident that blocks lanes) could cause unintentional violations of the time restrictions within a permission code. To accommodate unexpected delays, the MATS server can continuously compare actual traffic speeds to those used to calculate the permission restrictions. If additional time is needed for some vehicles, updated permission codes can be automatically issued. If the enforcement mechanisms don't allow individual permission codes to be updated, an alternative could be to divide the managed area into sub-regions (or road segments) and broadcast a set of global time extensions for those experiencing unexpected delays. If the route within a permission code passes through a sub-region or road segment with an extension, that time is added to the timing parameters contained within the code prior to performing the check for violations.

Another alternative for handling unexpected delays is to allow the enforcement network to generate the violation reports to the MATS servers, but perform post processing against actual traffic conditions that occurred along the routes traveled and in the permissions. If a violation was possibly due to road conditions, it could be automatically waived.

Permission checks may also be globally enabled, disabled, or modified in other ways for specific areas using a similar broadcast mechanism. A set of global permission parameters can be broadcast for each sub-region or road segment. It could, for example, specify that no permissions are required in an area, so no check needs to be performed by enforcement sensors.

Some implementations of a MATS system may only require permissions on a specific road segments during specific high demand times, and all other areas could be driven without any permissions or enforcement sensors. This might look to users very much like a standard toll road with automatic collection, except that some are able to use the road at no charge by waiting their turn in the MATS departure queue, and the MATS shortcut fee (described below) is the toll paid by others. In this case, it's perhaps easier for the public to understand if it's simply called a toll road, where the default is to pay a toll, and the MATS system provides an optional mechanism to receive toll discounts in return for waiting. Making the MATS system seem very similar to something users already understand and on limited routes might be a way to gradually roll out the system in a way that makes public adoption and MATS system tuning less disruptive. It should also be noted that reducing density on a primary arterial road, will have the collateral effect of reducing density on feeder roads, so controlling every road is not likely to be necessary.

Using History and Statistics

History and statistics may be used in the traffic control servers to better manage departure queues to achieve target traffic densities and flows, but it can also be used to improve the user interaction and reduce the amount of information that must be manually provided with each access request. A goal in one embodiment would be that, with a single button press, the user can be given access permission with the appropriate restrictions and queuing wait most of the time. It may be possible to use the history of a specific user or a set of users with similar behavior patterns to eliminate the need for detailed destination information. As the system learns behaviors, the correct destination can likely be predicted most of the time from automatically derived information such as their location, the time, day of the week, etc. An initial predicted destination and queuing wait may be offered. If not correct, the user may provide additional information to attempt to reduce the wait. That additional information may be as simple as direction of travel and/or approximate distance to destination, or a more specific destination or route.

If a predicted destination is not confirmed by the user but prediction algorithms are reasonably accurate, it's still possible to issue a permission code with fewer route restrictions, and the actual vehicle route may be tracked as the trip progresses to provide feedback for the prediction algorithms. This is because the overall effectiveness of the MATS system is not dependent on any one vehicle, but rather the aggregate behavior of a large number of vehicles. For example, if predictions algorithms for a given request calculate a 90% chance of destination A and a 6% chance of destination B, traffic modeling on the MATS server might allocate space for 90% of a vehicle along the route to destination A and 6% of a vehicle along the route to destination B. The actual traffic densities achieved on the various controlled routes will be approximately correct as long as the calculated probabilities are on average close to correct. If there are known special events or days that will cause the prediction to be inaccurate, more user confirmation of destinations could be required or encouraged by extending the wait times for unconfirmed destinations.

To keep wait times for any given individual as fair as possible when averaged over a period of time, it's possible for the MATS system to keep track of the wait times for individual users and compare the averages to computed target fair averages for the routes taken. This comparison could then be used to add or subtract offsets to future waits so the average converges to the target.

Shortcuts and Reservations

Built upon the basic system described above, additional capabilities can provide for increased revenue, additional convenience, and result in fewer violations. One highly useful capability, both for revenue generation and user acceptance, is the ability to reduce the normal wait through fee-based shortcuts. A shortcut fee can be charged to bypass all or part of the departure queue. Road capacity could be reserved for a percentage of total users to take advantage of this option, and shortcut demand can be managed by adjusting the fee and/or rationing the number of times it can be used. All users may get a periodic allocation of shortcuts free of charge in one embodiment.

Advanced travel reservations may also be possible for a fee. At least two kinds of reservations can be useful. One is a departure time reservation, meaning the user wants to leave at a certain time (e.g., the end of the work day). The other is an arrival time reservation, meaning the user wants to arrive at a destination (e.g., for dinner or a meeting) at a certain time. The two are equivalent if the travel time is a known constant (something the MATS system can attempt to come close to), but they may be treated differently to correspond to the way people normally think about events and what happens if there are unexpected traffic delays. Reservation requests may have some time flexibility, and the amount of that flexibility could be used to adjust the amount of the fee. To the MATS system, a reservation is very much like a departure request with the option of paying for a full or partial shortcut if necessary. The fact that the MATS system knows in advance and understands the intent of the user may provide some benefit in usability and traffic load and queue management, so the fees for reservations (if provided) might be less that using the shortcut alternative.

Providing for shortcuts and reservations for a fee allows the system to be free and beneficial to the majority of users (saving both time and fuel costs), while simultaneously generating substantial revenue from a subset of users that can afford to trade off additional cost for additional time savings. Also note that some features of the MATS system may only be available to a subset of users that pay a subscription fee, perhaps monthly or annually. Paid subscribers might also receive additional hardware supporting additional capabilities.

Figure 3:
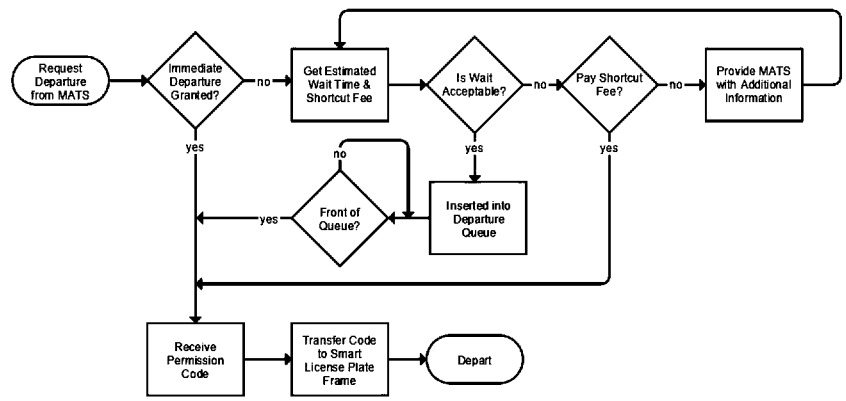
FIG. 3 shows another flowchart that illustrates another method according to one or more embodiments described herein.

FIG. 3 shows an example of a method according to one embodiment in which shortcuts can be used to shorten the waiting time by paying a shortcut fee. In this embodiment, a user's device makes a travel request and receives a response from the traffic control system indicating an estimated wait time, and the response can also indicate a current shortcut fee. The user at the user device can then decide whether or not the wait is acceptable. If the wait is acceptable, the user's travel request is then inserted into the departure queue, and the user can indicate that the wait is acceptable by selecting an option indicating the user is willing to wait rather than pay the shortcut fee. If the user elects to pay the shortcut fee then the user may get a shorter wait time or be able to leave immediately and receive a permission code from a traffic control system. In one embodiment, rather than paying the shortcut fee, the user may provide additional information to the traffic control system and receive an updated estimated wait time and shortcut fee. As shown in the example of FIG. 3, the permission code can be received by the user's device and then transferred through a Bluetooth connection to a smart license plate frame on the vehicle. In this case, the Bluetooth connection can be between the user's key fob or the user's smartphone, each of which can receive the permission code and then transmit the transmission code through a Bluetooth connection to the smart license plate frame on the vehicle. As described further below, the license plate frame can then transmit the permission code and other information to enforcement sensors along the route to allow verification of the authorization to travel along the route by the vehicle.

Enforcement

If a vehicle uses the roads in violation of the MATS protocols and regulations, a monetary fine is assessed and the registered owner is immediately notified by electronic means (text message, email, etc. in one embodiment). Violations can be determined automatically by the MATS system using sensors mounted on the roads or other vehicles. If the system provides for an in-vehicle feedback mechanism (e.g., a windshield mounted display device), a warning could be given to the driver that the vehicle is in violation, and should leave the controlled road as soon as possible or be fined. Such a warning and grace period could be especially useful when the system is first implemented to allow users to adjust behaviors, but might also be used as a mechanism to allow very short traversal of controlled roads without obtaining prior permissions. Fines could be contested or waived through the normal traffic court system, or through a more efficient process within the MATS system. Periodically, accumulated fines are noticed by mail, and any unpaid fines are required to be paid when the vehicle registration is renewed.

Visiting vehicles and certain government and public service vehicles can be exempted from participation in the system or be given an extended use permission code. Very short trips by anyone might also bypass the permission queue. Any restricted access permission issued must be used (i.e., the car must depart) or extended within a time window, or else it will be automatically be revoked and the user notified. Unused permissions may also cause a fine and/or the addition of time penalties in future requests made by that user to discourage spurious requests that reserve road capacity which is not utilized in one embodiment.

Minimizing Fraud

The effectiveness of the MATS system depends on the vast majority of users obeying its rules. However, there will inevitably be attempts by some to get the benefits of the system without paying the price, whether money or time. The implementation of the MATS system can take this into account and include safeguards to keep evasion levels low.

One method of attempting fraud would be to copy a legitimate license number and permission code, and mount a fake license plate matching that in the code on another vehicle. License/permission code pairs could be obtained by snooping on the exchange with enforcement sensors. If permission codes (or corresponding unique identifiers) read by the enforcements sensors are uploaded, the MATS server can watch for duplicate permission codes. Identifying other characteristics of the vehicle associated with every license number in the permission code (color, dimensions, etc.) could also help with detection. Limiting the range and direction of the exchange between vehicles and the enforcement sensors can make snooping more difficult. Creating a secure encrypted channel between the vehicle and enforcement sensor using standard encryption and key exchange techniques may also help prevent copying of permission codes.

A fake license plate might also be used without transmitting any permission code. Any fines levied after the fact would go to the wrong person (or no one). Using the enforcement network to track vehicles that have been detected with a fake license plate in real-time should provide the ability to catch most offenders attempting this. Additionally, if each visually identified license plate has associated with it an RFID tag that allows secure transmission of a unique and secret identification code (using standard public key encryption) to road-mounted sensors that can automatically verify the visible license plate number against that in the secret identification code, detection of fake license plates is made easier. If road-mounted sensors are used in verifying the permission codes, they can also perform electronic verification of the license plates.

Minimizing Gaming of the Departure Queue

Another potentially undesirable user practice is attempting to game the departure queue wait by requesting permission before actually being ready to leave when it's known that a long wait is likely. Examples would be the beginning and end of the typical work day (i.e., rush hours). That kind of gaming might be difficult to do successfully if it's common and it doesn't necessarily decrease traffic flow efficiencies, but it could still lead to user behaviors that make things less fair and more difficult for everyone to deal with. To dissuade users from submitting early departure requests, the MATS system can introduce some randomness to the wait times, along with time penalties on one or more future requests if departure doesn't occur within a short time after receiving departure permission. Also, all requests coming in over a short period of time can be grouped together and given a randomly assigned order. The user can be advised of the minimum and maximum wait time prior to confirming a request, however once the request is confirmed, it can't be cancelled without incurring the penalty. Once confirmed, it may be possible for MATS to give the user a reasonably accurate estimate of the departure time to facilitate productive use of the time prior to departure.

Shifting Demand

In addition to the techniques described above for managing traffic flows, there may be other features of the MATS system to spread the demand and reduce worst case waits in the departure queue. Requiring vehicles to take prescribed routes through lower demand areas could increase overall road capacity. The required route can be reflected in the restrictions contained within the permission code, and in exchange a shorter wait in the departure queue could be offered. Providing public information about average wait times throughout the day in a way that is easy for users to access might encourage rearranging of schedules to avoid long waits. Fees charged by the MATS system could also be higher during times of high demand. If work schedules are somewhat flexible, time spent working while waiting in the departure queue one day might allow a later start (after the traffic peak) in a subsequent day. Also, random selection of people could be offered cash or future benefits (such as a shorter wait or fee waiver in the future) in return for leaving earlier or later to shorten the queue wait for others.

Reducing Demand

Ride sharing is one way to reduce demand by increasing the number of vehicle occupants per vehicle. Independent systems (e.g., smartphone apps) already exist to facilitate connecting people who are travelling between similar destinations for the purpose of ride sharing. Including that functionality within the MATS system can make the process simpler and help encourage ride sharing behavior. While users are waiting in the queue, the MATS servers often know where they are going, and would be able to match them up according to start/end pairs. If users accept a ride sharing matchups, they could receive benefits within the system, such as reducing or eliminating the queuing wait, or accruing a credit for future shortcut minutes.

Enhanced Privacy Protections

Effectively combating fraud creates a conflict between security and privacy. Privacy leads one to keep the identity and vehicle license number of persons requesting permissions unknown by a central organization. However, thwarting attempts to evade the rules of the system likely require some centralized knowledge of who is asking for what. That centralized knowledge could then be used to immediately detect evasion attempts such as fake license numbers (whether fabricated or someone else's) and duplicate requests for the same license number.

In the absence of some other solution, one possible compromise is to separate the knowledge necessary for fraud detection into a separate organization (Permission Privacy Server, or PPS) from the MATS system. The PPS can have its own privacy protection mechanisms, reducing that burden for the MATS servers—MATS management can't abuse what it doesn't know. All permission requests from users, in one embodiment, can go to the PPS in a way that allows the identity of the user and the license number to be known and saved, i.e., any identity related security encryption can be decrypted in the PPS. After performing any necessary fraud checks using its database of license numbers and permission requests (e.g., ensuring there is only one permission request for each vehicle at any given time, and only for legitimate license numbers), the PPS can then anonymize the request, including substituting a salted hash of the license number, and pass it on to the central MATS server. The salt value can come from the user or be generated in the PPS and sent to the user. The permission code, once granted, could be sent back to the requesting user through the PPS. If there is an exchange of multiple messages between the MATS server and the user (e.g., to negotiate a shorter wait or purchase a shortcut), they can all be routed through the PPS to keep the user anonymous.

If an issued permission code or request needs to be cancelled (e.g., due to change of user plans or traffic blockage), that information can be conveyed to the PPS by the user or the MATS server so a subsequent request won't appear to be an attempt to submit multiple overlapping requests for the same vehicle.

To further ensure privacy, it may be desirable keep the PPS from having unnecessary knowledge associated with a permission, such as starting location, destination, and route. The PPS could have, for example, the identities but not the locations, and the MATS server could have the locations but not the identities. One way to accomplish this is to encrypt some of the information contained within requests sent through the PPS in a way that can only be decrypted by the MATS server, for example using public key encryption. Part of that encrypted data could be a secret UserKey that could be used to encrypt information in resulting permission code or other response. The UserKey would not be known by the PPS, so information can be passed back through the PPS while keeping part of its contents (e.g., routing) secret. If restrictions in the permission code are encrypted with the UserKey, that key would be transmitted by the vehicle to enable permission code restrictions to be verified by the enforcement sensors.

A possible embodiment of the permission requests and codes with additional privacy features is shown below in Table 2:

TABLE 2

```
UserPermissionRequest = [UserID, LicenseNumber, LicenseSalt, LocationPacket]
LocationPacket = [Encryption(MATSpublicKey, LocationData, UserKey)]
LocationData = [StartLoc, DestLoc]
PPSpermissionRequest = [LicenseID, LocationPacket]
LicenseID = Hash(LicenseSalt, LicenseNumber)
PermissionCode = [PermissionData, DigitalSignature]
PermissionData = [LicenceID, VehicleDescription, StartTime, Duration, LocationRestrictions]
VehicleDescrition = [VehicleYear, VehicleMake, Vehicle Model, VehicleColor]
LocationRestrictions = [Encryption(UserKey, StartLoc, TripSegment, . . . , TripSegment)]
DigitalSignature = [Encryption(SigPrivateKey, Hash(PermissionData))]
StartTime = GMT time of day when permission becomes valid
Duration = Length of time permission stays valid
StartLoc = GPS latitude and longitude of starting location
DestLoc = GPS latitude and longitude of destination location
TripSegment = [DeltaLatitude, DeltaLongitude, DeltaTime, MaxDeviation]
DeltaLatitude = Change of latitude between start and end of segment
DeltaLongitude = Change of longitude between start and end of segment
DeltaTime = Allowed travel time between start and end of segment
MaxDeviation = Maximum allowed distance from straight line between start and end of segment
TransmittedPermission = [PermissionCode, LicenseSalt, UserKey]
```

FIG. 6 shows a method according to one embodiment which uses a permission privacy server or set of such servers to provide privacy with respect to the user's vehicle identification. In operation 601, a permission privacy server (PPS) receives a user's request to travel. This request may be made by a user's key fob or smartphone which includes an app configured to work with the traffic control system and the PPS. The request can specify the vehicle's license number or some other vehicle identifier and optionally also specify a user identifier. In one embodiment, the PPS receives the user's request and the license number and verifies the license number is valid and unique. It will be appreciated that operation 601 is performed in a way in which the traffic control system, such as the traffic control system servers 401 do not receive the request to travel but rather the PPS receives the request to travel in order to allow the PPS to anonymize information about the request, such as the user's identity or the vehicle identifier of the user. In one embodiment, the system may provide further privacy by hiding the route information from the PPS while providing the route information to the traffic control system servers, such as the servers 401. In this case, the PPS 405 receives the travel request and does not receive the route information (or the route information is encrypted and therefore is unreadable by the PPS) while the traffic control system servers receive the route information or can decrypt the encrypted route information. Referring back to FIG. 6, in operation 603, the PPS creates a salt value (or receives a salt value from the user's device) and combines the salt value and the license number and generates a hash of the combination of the salt value and the license number which results in the generation of a salted hash of the license number. Then in operation 605 the PPS can transmit the salted hash to the traffic control system. In one embodiment this can involve the PPS 405 transmitting the salted hash through link 401C to the traffic control system servers 401 shown in FIG. 4. In addition, in operation 605, the PPS transmits the salt value to the user's device which made the on demand request to travel or to another device associated with the user's vehicle. It will be appreciated that if the salt value was received from the user device in operation 603 that it will not be necessary to transmit the salt value to the user's device. Then in operation 607, the traffic control system, such as the servers 401 shown in FIG. 4 generate a permission code in response to request to travel and transmit that permission code to one or both of the user's device or to the vehicle. In one embodiment the permission code includes the salted hash which can then be used by an enforcement server, such as the enforcement servers 407 shown in FIG. 4. While the vehicle is traveling, operation 609 can be performed in which the user's device or a device mounted on the vehicle transmits the salt value and the vehicle's identifier, such as a license plate number, and the permission code to one or more enforcement sensors, such as a fixed roadside enforcement sensor. In an alternative embodiment of operation 609, one or more cameras (such as a camera coupled to an enforcement sensor) capture an image of the vehicle's license plate, and optical character recognition is performed on the image to extract the license plate number (or other vehicle identifier) which is then provided to the enforcement sensor, and the user's device or device on the vehicle transmits (through one or more RF transmission(s)) the salt value and the permissions code to the enforcement sensor. In operation 611, the enforcement sensor, having received the information in operation 609 uses the salt value and the vehicle's identifier and the permission code to determine whether the vehicle is authorized to be traveling on the route. In one embodiment, the device which transmits the information described in operation 609 can be a smart license plate frame or some other device mounted on the vehicle. This information can be provided to the device mounted on the vehicle by a Bluetooth connection with the user's device, such as a key fob or a smartphone as described herein.

If the networking hardware between the user and the MATS server has communication routing protocols that can be used ensure the anonymity of the user (e.g., a proxy server), alternatives to sending user/MATS communications through the PPS are possible. One alternative is to use the PPS to simply provide validated LicenseID's. The user could, for example, request a validated LicenseID from the PPS for a specific LicenseNumber and LicenseSalt. The PPS would perform its fraud checks, for example verifying a legitimate LicenseNumber for that user and only allowing one active LicenseID per LicenseNumber. Once validated, the LicenseID would be sent by the PPS to the MATS server, which would maintain a database of PPS-validated LicenseID's. The PPS would then inform the user that the LicenseID has been validated, and can be used in direct communications with the MATS server. If the user later requests a different LicenseID for the same LicenseNumber, the previously validated LicenseID would be invalidated by sending a message to the MATS server. Using this procedure, it's not necessary to send any location related information to the PPS.

Figure 5:
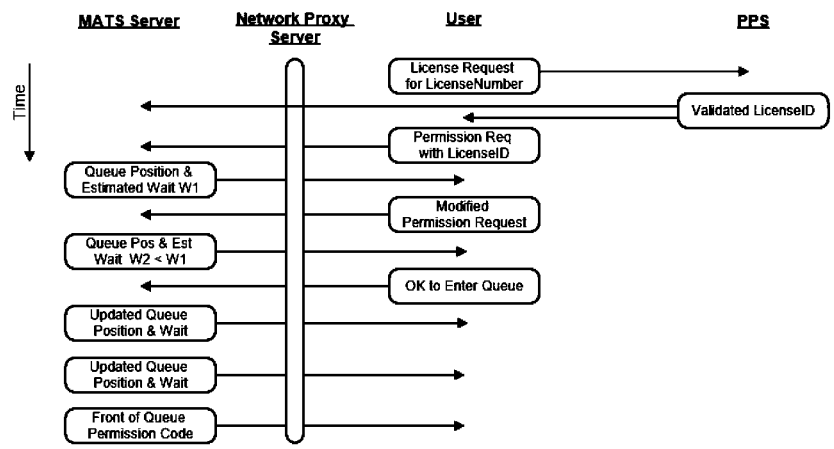
FIG. 5 is a diagram of an embodiment of a permission request sequence.

A diagram of one possible permission request sequence using a network proxy server and Permission Privacy Server to preserve user anonymity is shown in FIG. 5.

As shown in FIG. 5, four different components of a system can interoperate to provide user anonymity. Those four separate components can include a network proxy server operating in the manner shown in FIG. 5, one or more traffic control system servers, such as the traffic control system servers 401 shown in FIG. 4, a PPS, such as the PPS servers 405 shown in FIG. 4, and one or more user devices, such as the user devices 403 shown in FIG. 4. The method shown in FIG. 5 can begin when a user makes a request through the user's device for a license number, where this request is made to the PPS, such as the PPS 405. The PPS responds with a validated license ID. Then the user device can make a request to travel with the license ID. Then the traffic control system servers can respond to that request as shown in FIG. 5, which ultimately leads to the traffic control system providing an authorization to leave or providing a time during which the trip or travel can begin.

An alternative method of concealing the license number from the MATS server is to use an encryption of the license number, rather than hashing, to generate the LicenseID. A LicenseKey would take the place of LicenseSalt, and be transmitted locally by the vehicle to the enforcement sensors. The enforcement sensors could then decrypt the LicenseID contained in the PermissionCode using the LicenseKey to get a license number. The decrypted license number would then be compared to what is on the license plate.

Figure 4:
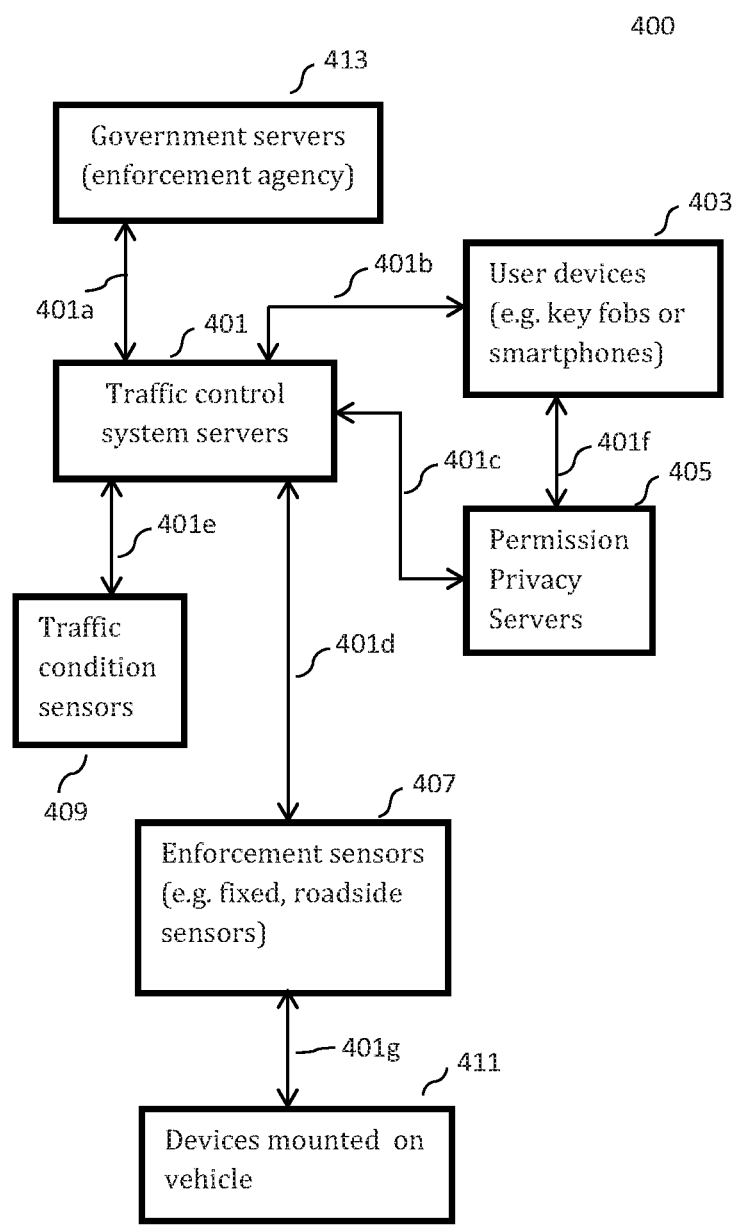
FIG. 4 is a system diagram that shows various devices that can operate together in a traffic control system.

FIG. 4 shows an example of a system 400 which can include multiple components to provide for improved traveling along one or more routes that are controlled by a traffic control system as described herein. One component is the traffic control system servers 401 which also are referred to as MATS. These servers 401 receive the request to travel from the user devices 403 through a link 401B. The link 401B, and the other links shown in FIG. 4 (links 401A, 401C, 401D, 401E, 401F, and 401G) can be any one of a variety of known communication links and can be either wired or wireless or a combination of wired and wireless, and can include the use of the Internet, WiFi communication, cellular telephone communication, wireless pager communication, etc. The user devices 403 can be any of the user devices described herein including key fobs or smartphones, where the smartphones can include an app or several apps designed or configured to operate with the traffic control system servers 401. In one embodiment, a permission privacy server or PPS 405 can also be used to provide privacy to a user request. The traffic control system servers 401 operate with the traffic condition sensors 409 in order to receive information about the current traffic congestion condition. In one embodiment the traffic condition sensors 409 can be conventional cameras or other sensors used to monitor the state of traffic and road conditions and provide that information back to the traffic control system servers 401 through the link 401E. The system 400 also includes in one embodiment one or more enforcement sensors 407, which can be fixed roadside sensors that are designed to receive information about vehicles on the one or more routes controlled by the traffic control system servers 401. In one simple embodiment, the enforcement sensors can be cameras capturing images of license plates on the vehicles on the route. In another embodiment, the enforcement sensors can be radio frequency devices that receive RF transmissions containing permission codes and vehicle identifiers from devices on the vehicles, such as the devices 411. In another embodiment, the enforcement sensors 407 can be devices mounted on other vehicles which receive transmissions from vehicles near them and report violations to the traffic control system servers 401 which can in turn report the violations to the government servers 413 which can be part of an enforcement agency such as the police or the Department of Motor Vehicles or other such government agencies.

Figure 12:
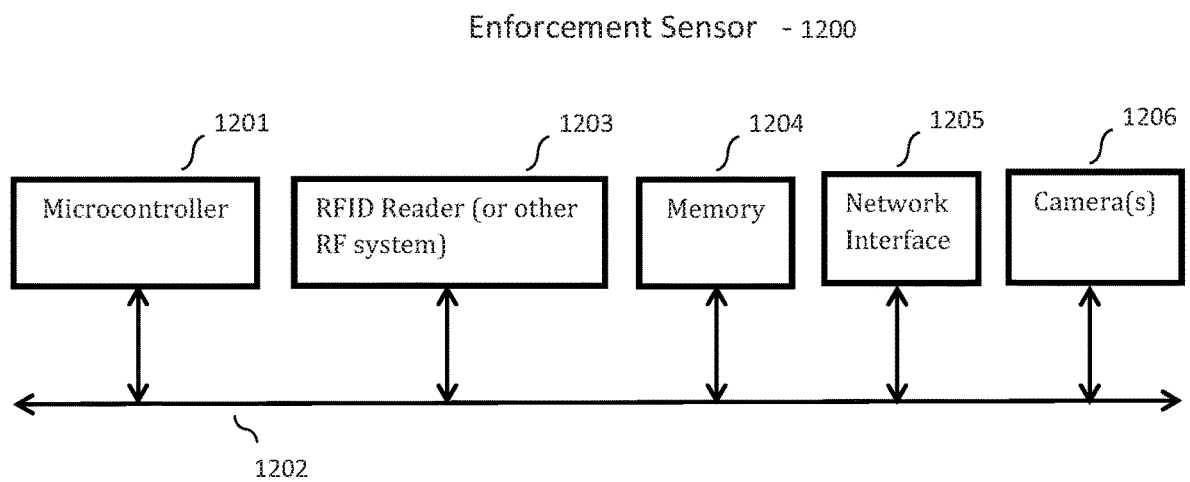
FIG. 12 shows an example of an embodiment of an enforcement sensor that can be used with a traffic control system.

An example of an embodiment of an enforcement sensor is shown in FIG. 12. The enforcement sensor 1200 in FIG. 12 includes a microcontroller 1201, an RFID reader 1203 (or other RF system), a memory 1204, and a network interface 1205, and one or more buses (or other interconnects) 1202. The microcontroller 1201 can be configured, in one embodiment, to operate sensor 1200 by computer program instructions stored in memory 1204 which is coupled to the other components in sensor 1200 by the one or more buses (or other interconnects) 1202. The memory 1204 can be one or more types of memory (e.g. DRAM, flash memory, etc.) and can be an example of non-transitory machine readable memory that stores the computer program instructions that cause the sensor 1200 to operate as one or more of the various enforcement sensors described herein. In another embodiment, the microcontroller 1201 can be replaced by a microprocessor and in yet another embodiment, the microcontroller can be replaced by an ASIC (Application Specific Integrated Circuit). The network interface 1205 can be an Ethernet interface or a WiFi interface or a cellular telephone transceiver or other known transceivers that can provide a communications link (such as 401D shown in FIG. 4); in another embodiment, one or more enforcement sensors can be coupled through a communication link to an enforcement agency (e.g. government servers 413 shown in FIG. 4) or to both the enforcement agency and to the servers of the traffic control system. The network interface 1205, in one embodiment, can communicate any violations detected by the microcontroller 1201 to one or both of the traffic control system or the enforcement agency. The RFID reader 1203 can be similar to RFID readers that receive RF transmissions from toll transponders; for example the RFID reader can receive RFID signals that include permission codes, or in another embodiment permission codes and optional salt values, or in yet another embodiment permission codes and optional salt values and vehicle identifiers. The RFID reader 1203 receives this information and provides the information to the microcontroller 1201 which can then perform the operations to determine whether the vehicle is authorized to travel on the route at the current time. In one embodiment, the RFID reader 1203 can be implemented with an encryption system (e.g. a public/private key cryptography system) that exchanges encrypted signals between the device on the vehicle (such as a toll transponder or a smart license plate frame) and the RFID reader 1203 such that the content of the communication is encrypted (e.g. the permission codes and optional salt values are encrypted or the permission codes and the optional salt values and the vehicle identifier are encrypted). The sensor 1200 can also include (or be coupled to) one or more sensors 1206 that are positioned to capture images of license plates on the vehicles on the monitored route and to provide those images to the microcontroller 1201. The captured images are processed with conventional optical recognition character (OCR) technology to provide the vehicle identifiers; the OCR processing can be done in the one or more cameras or in the microcontroller 1201 or in the other processing systems. These one or more cameras 1206 can be used in those embodiments in which the device on the vehicle transmits its permission code (or its permission code and salt value) but does not transmit the vehicle identifier.

The memory 1204 can store program instructions which, when executed, cause the enforcement sensor to perform operations to monitor the vehicles for authorization on the route. These operations can include, in one embodiment: receiving one or more transmissions from one or more vehicles, where these transmissions can include one or more permission codes and one or more optional salt values. These transmissions can also include vehicle identifiers or the vehicle identifiers can be obtained from character recognition performed on images captured with one or more cameras. The sensor 1200 generates a hash of the vehicle identifier (using the same hashing algorithm used to generate the hashed vehicle identifier in the permission code) and compares the hash it generated to the hash contained within the permission code, and if the values match (indicating that the vehicle identifier within the permission code and the vehicle identifier on the vehicle match) and if the permission code indicates the vehicle is authorized to be on the route, then no violation message is transmitted. On the other hand, if the values do not match (e.g. the hash of the vehicle identifier in the permissions code and the hash of the vehicle identifier obtained from the camera(s) do not match) or if the permission code is not valid for travel on the current route at the current time, then the enforcement sensor 1200 transmits a violation message (specifying the vehicle identifier and other information such as route and time and date) to the traffic control system and/or enforcement agency.

Equipment Requirements

There are many different hardware configurations possible for control, user interaction, and enforcement. Some require little to no additional user/vehicle equipment, placing the operation and enforcement equipment burden on road infrastructure and centralized servers. At the other end of the spectrum, more dedicated devices are associated with the vehicles and drivers. Although potentially increasing implementation costs, the potential benefit of providing the additional hardware can be easier user interaction, higher compliance, higher revenue, greater adaptability, and additional features for flow management, privacy, safety, and convenience.

The minimum implementation requires no specific per-vehicle hardware. Permissions can be requested via existing general purpose communication methods, including, for example, phone, text message, smartphone app, or Internet website. In response to a request, the MATS server makes an entry in a central permission database, including the vehicle license number and any restrictions associated with the permission. Additionally, the user is given advisory information regarding the permission granted. Enforcement is performed using a network of road mounted cameras performing license plate recognition. The location, time, and license number of each vehicle is checked against permissions in the central database. The checking operation can be centralized, or the relevant parts of the database can be downloaded to local enforcement camera controllers, which would perform the check locally. If the check is done locally, violations would be reported back to the central server for further enforcement action.

The MATS system can also be implemented using additional dedicated hardware associated with each vehicle and/or driver. Below are four example hardware configurations that might be used at cost points from low to high for the vehicle associated hardware.

Four types of driver/vehicle associated hardware are presented in the examples below that may be used in various combinations depending upon cost and feature considerations. First is a very small, low cost key-fob device that can be easily attached to a key ring, and intended to always be carried with the driver in a pocket or purse. Second is a device similar in function to a standard toll transponder that would be attached to the interior windshield of vehicles to transmit a code when queried by a road-mounted enforcement sensor. Third is a smart license plate frame that is used in the enforcement protocol and could also include safety-related sensors. It might contain much of the same hardware a smartphone would, including significant processing capabilities, wireless communication, GPS receiver, imaging and other sensors. In fact, because of the low cost of high volume cellphones, the best way to implement this device could be to repackage the electronics contained in an existing cellphone design into a weatherproof license plate frame form factor. The fourth type of hardware is an in-vehicle touch-screen display that would be mounted in the driver's field of view at the bottom of the windshield or top of the dashboard to provide feedback and warnings in a way that does not distract from driving. The best implementation of this device might be to use the hardware and packaging of an existing high-volume GPS navigator, but with custom programming.

Hardware Example A: Lowest Cost Per Vehicle with Ease of Use

Figure 7:
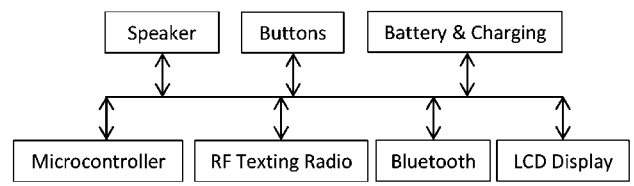
FIG. 7 is a block diagram of an embodiment of a key fob.

This example, shown in FIG. 7, provides just enough vehicle/driver hardware to make the user interface very simple and quick. The only user equipment is a small, low cost key fob that has the functionality of a text messaging device (like a pager) with a few buttons and a small display. While it's possible to use a cellphone for this function as describe previously (and phones would likely be an alternative access granting method), it's useful to provide a dedicated device that can be kept with the vehicle keys or in the vehicle. With this device, the access request/grant protocol (described previously) can be an interaction of just a few seconds. It is useful to keep that interaction quick and easy to maximize user compliance, especially when the MATS system is first introduced. Usability considerations for the key fob would likely require battery life to be a minimum of weeks, not days, with charging and configuration through a standard USB connector. Because of the small size and long battery life desired for the fob, actively transmitting a permission code may not be possible. It's therefore assumed that road-mounted license plate optical character recognition could be used for enforcement in this example—checking each license plate against a central real-time database of allowed vehicles. This may raise privacy concerns.

FIG. 7 shows a system diagram of a key fob which includes a microcontroller, which can have memory containing a stored computer program and memory coupled to a processing system in the microcontroller. The microcontroller can be coupled through one or more buses to the remainder of the system which includes an RF texting radio, a Bluetooth transceiver, a liquid crystal display, a battery and charging system, and one or more buttons for user input, and a speaker. The microcontroller with its internal processing system can be configured to operate in the manner described herein for the key fobs described herein. This will allow the user to make a travel request through the key fob in one embodiment and then receive the authorization to travel from the traffic control system, where the authorization to travel can be displayed on the key fob or announced through the speaker of the key fob. The authorization to travel can be provided well before the trip begins by specifying a waiting time, optionally with a countdown counter. Alternatively, the user may be required to wait for a start signal indicating that the travel can begin, without realizing how long the wait may be. The battery can provide power for the rest of the system or be charged through the charging system in the key fob. The Bluetooth component of the key fob can be used to allow communication between the key fob and the device mounted on the vehicle, such as a smart license plate frame. This Bluetooth transceiver can communicate with such a device so that the permission code received from the MATS can be transmitted from the key fob to the device mounted on the vehicle such as a smart license plate frame.

Hardware Example B: Low cost per vehicle, adding privacy

Figure 8:
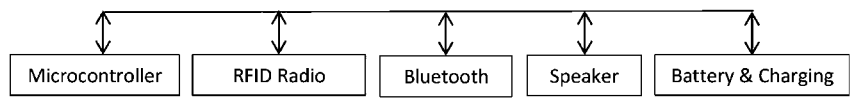
FIG. 8 is a block diagram of an embodiment of a transponder which can be used with a key fob.

This example, shown in FIG. 8, adds a toll transponder containing a Bluetooth wireless interface to communicate with a key fob. The key fob contains a long range texting radio, as in Example A (FIG. 7), but with a Bluetooth interface added for communication to the vehicle mounted toll transponder. This combination provides sufficient hardware and battery size in the transponder to use transmitted permission codes with a salted hash of the license number for enforcement identifiers, thus allowing increased privacy safeguards. The permission code could be received from the MATS server by the key fob while away from the vehicle. Just prior to departure, the key fob transfers the permission code and salt value via Bluetooth to the toll transponder, which can be mounted near the front windshield of the vehicle. Road mounted enforcement sensors would contain cameras with license number recognition and RFID readers to poll the permission codes and salt values on toll transponders of passing vehicles. The permission code associated with each vehicle would be checked against its restrictions to identify violations.

FIG. 8 shows an example of a transponder system which is a form of a device that can be mounted on a vehicle and can operate in conjunction with another user device such as a key fob or user's smartphone. The transponder shown in FIG. 8 can include a microcontroller, an RFID radio, a Bluetooth transceiver, a speaker, and a battery and charging system. All of these components can be coupled together through one or more buses as is known in the art, and the microcontroller can include a processing system and memory coupled to the processing system, where the memory can store computer program instructions to cause the transponder to function as one of the devices mounted on the vehicle as described herein. The Bluetooth transceiver shown in the transponder of FIG. 8 can be used to provide communication between the transponder and the user's key fob or smartphone. In this case, the Bluetooth transceiver can receive a permission code from the key fob or the smartphone, where the permission code will then be transmitted during the route so that enforcement sensors can receive those permission codes and determine whether or not the vehicle is authorized to travel on the route. The RFID radio can provide information such as the vehicle identifier of the vehicle to those enforcement sensors where the vehicle identifier can be the license plate number of the vehicle or other vehicle identifiers such as unique RFID of the vehicle. The RFID radio may also transmit signals to an enforcement sensor, such as signals including the permission code and optionally a salt value as described herein for certain embodiments.

Hardware Example C: Medium Cost Per Vehicle, Adding Crowd-Based Enforcement

Figure 9:
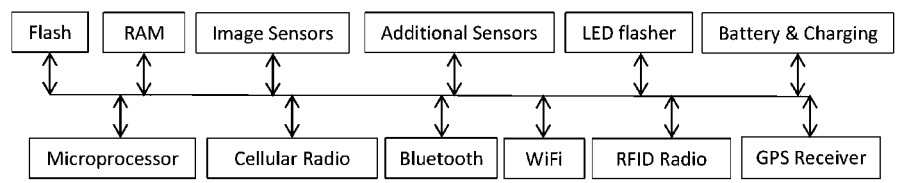
FIG. 9 is a block diagram of an embodiment of a device that can be mounted on a vehicle and can operate with a smartphone and/or a key fob.

In this example, shown in FIG. 9, the key fob is a Bluetooth device that is simply a button and display peripheral for a smartphone application. The smartphone itself may already be owned by the driver, or a very low cost smartphone could be provided to support the MATS protocols. A device can be mounted to the front of the vehicle, for example, as a smart license plate frame (or as a smart license plate). The license plate frame is a convenient mounting point since it's generally standardized, and concealed routing of power to the device from under the hood is relatively straightforward. An alternative to routing power from under the hood would be to use a small wind turbine generator and battery to take advantage of the wind that is always available when the vehicle is moving. This smart plate frame would provide a control processor, a GPS receiver, a radio frequency (RF) transceiver to transmit and receive permission and salt codes, image sensors to read the rear license plate of nearby vehicles, and Bluetooth or WiFi communication to the smartphone. Every so-equipped vehicle then becomes part of the enforcement network, with the ability to verify permissions locally and only send the license number of vehicles in violation to central MATS servers. As in Example B, using a salted hash of the license number in the transmitted permission codes allows this hardware configuration to provide additional privacy protections not possible in Hardware Example A.

FIG. 9 shows an example of a device which can be mounted on a vehicle and which can operate in conjunction with other user devices such as a user's smartphone or key fob. The example of FIG. 9 shows a smart license plate frame system which includes a plurality of components which can be connected together through one or more buses as is known in the art. The components can include a microprocessor, a wireless cellular telephone radio, a Bluetooth transceiver, a WiFi transceiver, an RFID radio, a GPS receiver, a battery and charging system, an LED flasher, image sensors, optional additional sensors, memory such as RAM and non-volatile memory such as flash memory. The Bluetooth transceiver or the WiFi transceiver can be used to provide communications between a user's key fob or smartphone so that the key fob or smartphone can transmit one or more permission codes received from a MATS server to the system of FIG. 9 and also transmit optionally other data such as a salt value as has been described herein.

An alternative to the smart license plate frame would be mounting the device in the engine compartment near a power source, and cabling to image sensor and antennas that peeks through or under the front grille of car or at the base of the windshield. The device could also be inside the windshield, but concealing power cabling would be more problematic with that location.

Figure 10:
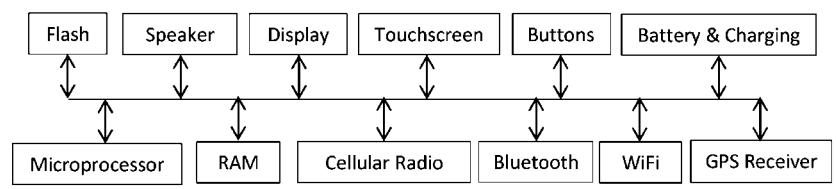
FIG. 10 is a block diagram of a system of car mounted devices that can operate with user devices such as a smartphone and/or a key fob.

Hardware Example D: Higher Cost Per Vehicle, Adding Safety and Convenience Features This example, shown in FIG. 10, provides the most capable and adaptable hardware, not only for implementation of core MATS functions, but also additional safety and convenience features. In this example, both front and rear smart license plate frames are provided and given a higher total budget to allow for additional capabilities, such as a faster processor, more RAM and flash memory, additional sensors (acceleration, magnetic, ultrasonic, microphone), higher resolution video, speaker, etc. Power for the rear smart plate frame can come from some combination of dedicated battery, solar cell, and vehicle power (possibly from the license plate light socket, with the plate frame illuminating the plate). The key fob can be the same as in Example C (FIG. 9). Finally, an in-vehicle touchscreen display device with GPS, Bluetooth, WiFi, and cellular internet access is added to allow much more interaction with the driver while on the road. The availability of front and rear cameras allows an alternative permission code transmission method using modulated LED's and image sensors (i.e., Visible Light Communication), which can limit reception to narrow arc directly in front of and behind vehicles to make snooping on the exchange more difficult. Note that snooping can also be made more difficult in an RF transmission scheme by using directional antennas (or antenna arrays) and keeping transmitted power low, taking advantage of the fact that in traffic where permission codes are required, typical vehicle separation is not large. Communication can also take place over an extended period of several seconds, so a roadside receiver isn't within range for the entire transaction.

FIG. 10 shows an example of an in vehicle display device system which includes a plurality of components which are similar to the components shown in FIG. 9. These components can be interconnected with one or more buses as is known in the art. The system shown in FIG. 10 can include a microprocessor, memory such as RAM, a wireless cellular telephone radio, a Bluetooth transceiver, a WiFi transceiver, a GPS receiver, a battery and charging system, one or more buttons to allow for user input, a touch screen and display to provide both a display for output and a surface for inputting through a touch input device on the touch screen and a speaker and non-volatile memory, such as flash memory. The Bluetooth transceiver and WiFi transceiver can be used to provide communication between the user's key fob and the user's smartphone to allow either the key fob or the smartphone to transmit permission codes from the key fob or smartphone to the system shown in FIG. 10 which can then transmit the permission codes through enforcement sensors as described herein.

The examples above are just a sample of the numerous vehicle-related hardware variations possible when implementing the MATS system. Also, different classes of vehicles or levels of service could have different equipment. For example, what's used for cars could differ from what's used on motorcycles, the equipment for commercial vehicles could differ from private vehicles, and paid subscribers could receive additional equipment.

Additional Capabilities

If a government chooses to implement the MATS system broadly, requiring in-vehicle electronics in most or all vehicles, it presents an opportunity to add additional capabilities to participating vehicles that can enhance vehicle safety and convenience. Those additional capabilities may not, on their own, justify a mandated deployment, however the incremental cost of adding them to a system primarily deployed to deal with intolerable traffic delays may be minimal. These incremental capabilities, if included, may be standard or require additional fees.

The types of real-time route and bottleneck avoidance guidance given in typical GPS navigators can be integrated into the system. The communication network, vehicle mounted cameras, and in-vehicle display provided to implement the MATS system can also be used to give drivers numerous warnings such as backup obstacles, vehicles in blind spots, imminent collision, emergency vehicle approaching, road potholes or debris, flooding, lack of driver attention, traffic rule violations or reckless driving, excessive speed for conditions, etc.

Those same hardware capabilities could also be use in various ways to assist in crime enforcement and prevention. Camera video can be analyzed for vehicles and faces described in police bulletins to assist in criminal searches. Recorded video can serve as a video record of crimes to assist in investigation, apprehension, and prosecution. Automatic police/ambulance notification of accidents can improve response time and minimize traffic disruptions.

In addition to communicating with and through central servers, direct Vehicle-to-Vehicle (V2V) communication could be supported to provide predictive warnings of potential collisions and other benefits envisioned for V2V technology.

Finally, there may be additional revenue generation opportunities from the ability to display advertisements (non-distracting, of course) and location-related discounts (for example while waiting in a departure queue).

Figure 11:
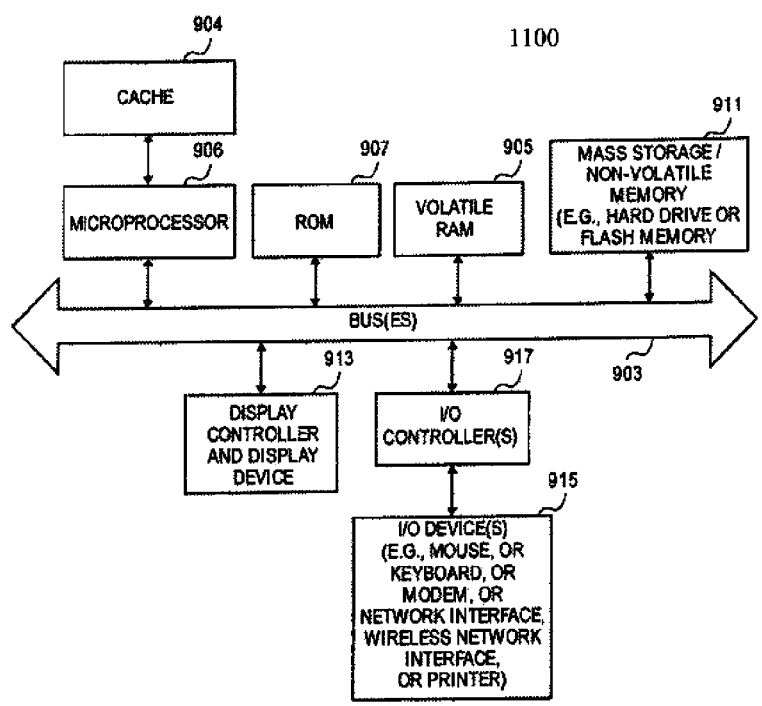
FIG. 11 shows an example of an embodiment of a data processing system which can be used to implement the one or more servers and other processing systems described herein.

FIG. 11 shows one example of a data processing system, which may be used with any one of the embodiments described herein. Note that while FIG. 11 illustrates various components of a data processing system, it is not intended to represent any particular architecture or manner of interconnecting the components as such details are not germane to this description. It will also be appreciated that network computers, tablet computers, smartphones, laptop computers, desktop computers, other consumer electronic devices and other data processing systems which have fewer components or perhaps more components than those shown in FIG. 11 may also be used with one or more embodiments described herein. The servers described herein (such as any one of the servers in the MATs or traffic control system or the PPS servers) can be implemented in a form similar to that shown in FIG. 11, and the user devices described herein can be implemented in a form similar to that shown in FIG. 11.

As shown in FIG. 11, the computer system 1100, which is a form of a data processing system, includes a bus 903 which is coupled to one or more microprocessor(s) 906 and a ROM (Read Only Memory) 907 and volatile RAM 905 and a non-volatile memory 911. The microprocessor 905 is coupled to optional cache 904. The microprocessor 906 may retrieve stored computer program instructions from one or more of the memories 907, 905 and 911 and execute the instructions to perform operations described above. These memories represent examples of machine readable non-transitory storage media that can store or contain computer program instructions which when executed cause a data processing system to perform the one or more methods described herein. The bus 903 interconnects these various components together and also interconnects these components 906, 907, 905 and 911 to a display controller and display device 913 and to peripheral devices such as input/output (I/O) devices 915 which may be one or more of mice, touch screens, touch pads, touch sensitive input devices, keyboards, modems, network interfaces, printers and other devices which are well known in the art. Typically, the input/output devices 915 are coupled to the system through input/output controllers 917. The volatile RAM (Random Access Memory) 905 is typically implemented as dynamic RAM (DRAM) which requires power continually in order to refresh or maintain the data in the memory.

The mass storage 911 is typically a magnetic hard drive or a magnetic optical drive or an optical drive or a DVD RAM or a flash memory or other types of memory system which maintain data (e.g., large amounts of data) even after power is removed from the system. Typically the mass storage 911 will also be a random access memory although this is not required. While FIG. 9 shows that the mass storage 911 is a local device coupled directly to the rest of the components in the data processing system, it will be appreciated that one or more embodiments may utilize a non-volatile memory which is remote from the system, such as a network storage device which is coupled to the data processing system through a network interface such as a modem, an Ethernet interface or a wireless network. The bus 903 may include one or more buses connected to each other through various bridges, controllers and/or adapters as is well known in the art.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A method for providing traffic control, the method comprising:
   receiving a request, from a traveler, to travel in a vehicle having a vehicle identifier, the request originating from a device associated with the vehicle and the request comprising at least one of: (a) a destination or origin; (b) a direction of travel; (c) an origin and a destination; or (d) a route;
   receiving information about a current traffic congestion condition for the request to travel;
   determining a travel delay based on the request and current traffic congestion condition, wherein the travel delay represents a waiting time after the request to travel;
   transmitting a message, the message indicating when, based on the travel delay, the vehicle is authorized to begin to travel according to the request, wherein the message includes a maximum wait time prior to receiving a confirmation;
   transmitting a further message after receiving the confirmation from the traveler, the further message including a departure time, and wherein at least one of the message or the further message includes a permission code that specifies an identifier of the vehicle and route information, the permission code providing data for one or more enforcements of a violation of the departure time;
   receiving data from a set of sensors configured to provide information which is used to detect vehicles traveling on one or more roads without authorization, the data comprising at least one of (a) one or more camera images of one or more license plates; (b) radio frequency (RF) signals identifying one or more vehicles; or (c) violation data based on permission codes specifying identifiers of vehicles and route information for the vehicle; and wherein the current traffic congestion condition is based on at least one of: current density of vehicles along the route or current rate of flow of vehicles along the route; and
   wherein the permissions code comprises route information and other sufficient information to determine whether a detected vehicle on a route has been authorized to be on the route at the current time that the vehicle is detected on the route, and wherein the message is transmitted either soon after the travel delay is determined or around the time that the waiting period, required by the travel delay, expires, and wherein the method imposes a time window within which travel should begin and if travels does not begin within the time window, then the authorization to travel is revoked, and wherein the permission code is transmitted by a device on the vehicle to an enforcement sensor, and wherein the travel delay is calculated to provide a vehicle density below a threshold value that is below a traffic density that would exist without the traffic control provided by the method; and wherein the method receives a plurality of requests to travel which are placed in a virtual queue and the positions within slots in the virtual queue are randomized.

2. The method of claim 1 wherein the enforcement sensor is one of: an on-vehicle sensor or a roadside sensor.

3. The method of claim 1, further comprising:
   recording violations for traveling on roads without authorization based on the data received from the set of sensors;
   determining fines based on the recorded violations; and wherein the request to travel is an on demand request.

4. The method of claim 1, further comprising:
   receiving a request to shorten the travel delay, the request being accompanied by a consideration provided to receive the shortened travel delay.

5. The method of claim 1 wherein the request to travel is received through a permission privacy server which anonymizes the vehicle identifier; and
   wherein the permission codes comprises sufficient information to determine whether a detected vehicle on a road has been authorized to be on the road at the current time that the vehicle is detected on the road.

6. The method of claim 1 wherein the vehicle identifier is a license plate number and the request includes one of the license plate number or a hash of the license plate number or a salted hash of the license plate number.

7. The method of claim 1, wherein the enforcement sensor is a sensor in the set of sensors.

8. A non-transitory machine readable storage medium storing computer program instructions which, when executed by a data processing system, cause the data processing system to perform a method for providing traffic control, the method comprising:
   receiving a request, from a traveler, to travel in a vehicle having a vehicle identifier, the request originating from a device associated with the vehicle and the request comprising at least one of: (a) a destination or origin; (b) a direction of travel; (c) an origin and a destination; or (d) a route;
   receiving information about a current traffic congestion condition for the request to travel;
   determining a travel delay based on the request and the current traffic congestion condition, wherein the travel delay represents a waiting time after the request to travel;
   transmitting a message, the message indicating when, based on the travel delay, the vehicle is authorized to begin to travel according to the request, wherein the message includes a maximum wait time prior to receiving a confirmation;
   transmitting a further message after receiving the confirmation from the traveler, the further message including a departure time, and wherein at least one of the message or the further message includes a permission code that specifies an identifier of the vehicle and route information, the permission code providing data for one or more enforcements of a violation of the departure time;

receiving data from a set of sensors configured to provide information which is used to detect vehicles traveling on one or more roads without authorization, the data comprising at least one of (a) one or more camera images of one or more license plates; (b) radio frequency (RF) signals identifying one or more vehicles; or (c) violation data based on permission codes specifying identifiers of vehicles and route information for the vehicle; and wherein the current traffic congestion condition is based on at least one of: current density of vehicles along the route or current rate of flow of vehicles along the route; and wherein the permissions code comprises route information and other sufficient information to determine whether a detected vehicle on a route has been authorized to be on the route at the current time that the vehicle is detected on the route, and wherein the message is transmitted either soon after the travel delay is determined or around the time that the waiting period, required by the travel delay, expires, and wherein the method imposes a time window within which travel should begin and if travels does not begin within the time window, then the authorization to travel is revoked, and wherein the permission code is transmitted by a device on the vehicle to an enforcement sensor, and wherein the travel delay is calculated to provide a vehicle density below a threshold value that is below a traffic density that would exist without the traffic control provided by the method; and wherein the method receives a plurality of requests to travel which are placed in a virtual queue and the positions within slots in the virtual queue are randomized.

9. The medium of claim 8, wherein the enforcement sensor is a sensor in the set of sensors.

10. The medium of claim 8, the method further comprising:
recording violations for traveling on roads without authorization based on the data received from the set of sensors;
determining fines based on the recorded violations; and wherein the request to travel is an on demand request.

11. The medium of claim 8, the method further comprising:
receiving a request to shorten the travel delay, the request being accompanied by a consideration provided to receive the shortened travel delay.

12. The medium of claim 8 wherein the request to travel is received through a permission privacy server which anonymizes the vehicle identifier; and
wherein the permission codes comprises sufficient information to determine whether a detected vehicle on a road has been authorized to be on the road at the current time that the vehicle is detected on the road.

13. The medium of claim 8 wherein the vehicle identifier is a license plate number and the request includes one of the license plate number or a hash of the license plate number or a salted hash of the license plate number.

14. The medium of claim 8, wherein the enforcement sensor is one of: an on-vehicle sensor or a roadside sensor.

* * * * *